United States Patent [19]

Law et al.

[11] Patent Number: 4,957,757
[45] Date of Patent: Sep. 18, 1990

[54] METHOD OF EXTENDING SHELF LIFE AND ENHANCING KEEPING QUALITY OF FRUITS

[75] Inventors: David M. Law; Peter J. Davies; Martha A. Mutschler, all of Ithaca, N.Y.

[73] Assignee: Cornell Research Foundation, Inc., Ithaca, N.Y.

[21] Appl. No.: 186,321

[22] Filed: Apr. 26, 1988

[51] Int. Cl.$^5$ .................................................. A23B 7/00
[52] U.S. Cl. ..................................... 426/281; 426/102; 426/310; 426/321; 426/615; 426/656
[58] Field of Search ............... 426/102, 281, 310, 321, 426/323, 326, 333, 615, 656

[56] References Cited

U.S. PATENT DOCUMENTS

| | | | |
|---|---|---|---|
| 2,460,710 | 2/1948 | Nolan et al. | 426/333 |
| 2,578,752 | 12/1951 | Slade et al. | 424/232 |
| 2,604,409 | 7/1952 | Cothran | 424/320 |
| 4,154,858 | 5/1979 | Baker et al. | 426/333 |
| 4,344,971 | 8/1982 | Garbutt | 426/102 |
| 4,802,905 | 2/1989 | Spector | 71/68 |

OTHER PUBLICATIONS

Salunkhe et al., Postharvest Biotechnology of Fruits, vol. 1, CRC Press, Inc., Boca Raton, Fla., pp. 28–29.
Wills et al., Postharvest, 1981, New South Wales University Press Limited, Kensington, N.S.W. Australia, pp. 64–67.
Apelbaum et al., 1982, "Inhibition by Polyamines . . . ", Plant Physiology, vol. 70, 1221–1223.
Apelbaum et al., 1981, "Polyamines Inhibit Biosynthesis of Ethylene . . . ", Plant Physiology, vol. 68, pp. 453–456.
Hyodo et al., "Inhibition of 1-Aminocyclopropane-1-Carboxylic Acid Synthase Acitivity . . . ", Plant Cell Physiol. 27(3):391–393/1986.
R. Reggiani, C. Albert Cantu, I., Branbilla & A. Bertani, "Accumulation and Interconversion of Amino Acids in Rice Roots Under Anoxia", Plant Cell Physiol. 29(6): 981–987(1988).
T. Smith, "Polyamines", Ann. Rev. Plant Physiol 1985, 36:117–43.
Hyodo and Tanaka, "Inhibition of 1-Aminocyclopropane-1-carboxylic Acid Synthase Acitivity . . . ", Plant Cell Physiol. 27(3):391–393/1986.
Dibble et al., "Polyamine Content of Long-Keeping Alcobaca Tomato Fruit", Plant Physiol. 86, Columns 338–340 (1988).

Primary Examiner—Marianne Cintins
Assistant Examiner—Helen Pratt
Attorney, Agent, or Firm—Sughrue, Mion, Zinn, Macpeak & Seas

[57] ABSTRACT

A method of extending the shelf life and of enhancing the keeping quality of fruits which comprises contacting said fruits with amines selected from the group consisting of naturally occurring monoamines, diamines, polyamines related amino acids and their non-toxic salts; esters of naturally occurring related amino acids; naturally occurring precursors of monoamines, diamines, polyamines and their non-toxic salts; naturally occurring metabolites of monoamines, diamines, polyamines and their non-toxic salts; and synthetic analogues of the naturally occurring monoamines, diamines, polyamines and their non-toxic salts.

12 Claims, No Drawings

METHOD OF EXTENDING SHELF LIFE AND ENHANCING KEEPING QUALITY OF FRUITS

FIELD OF THE INVENTION

The present invention relates to a method of extending the shelf life of fruits and of enhancing the keeping quality of fruits during handling, packing, shipping, storage and while in the market prior to sale to the consumer. In particular, the present invention relates to a method of extending shelf life and enhancing keeping quality of fruits by contacting the fruits with naturally occurring amines or synthetic analogues of naturally occurring amines.

BACKGROUND OF THE INVENTION

Many fruits, including tomatoes, have a brief shelf life and period of keeping quality after reaching the ripe stage of development. Consequently, they are often harvested at an unripe stage and held in cool conditions during transport and prior to marketing. At that point, attempts are made to induce ripening, but ripening is often incomplete and the resultant quality is less than that of naturally-ripened fruit. Furthermore, even well-ripened fruits may rapidly become subject to over-softening, bruising, and other injury, and are more susceptible to invasion by pathogens.

Many attempts have been made to develop treatments which decrease the spoilage of fruits and vegetables, and among these attempts are methods which use amines to achieve their purpose.

For example, U.S. Pat. No. 2,460,710 describes a method and fungicidal composition for controlling organisms which cause decay of citrus fruits. The method involves contacting the fruits with 2-aminopyridine or its salts.

Additionally, U.S. Pat. No. 2,578,752 discloses a method for the control of destructive diseases of citrus fruits. The method involves contacting the fruits with an aqueous solution of salicyl anilide solubilized by the addition thereto of a synthetic organic amine base. Among the organic amine bases found suitable as a solubilizer for the salicyl anilide are amino methyl propanol, monoethanolamine, diethanolamine, triethanolamine, morpholine, aminobutanol, and di-ethylamine.

As another method, U.S. Pat. No. 2,604,409 describes treating fresh fruits and vegetables with a solution of an amide of a thioacid of a particular fatty acid series. The treatment allegedly prevents or reduces decay caused by certain types of rot organisms to which many food commodities are commonly subject while being shipped to marketing centers and ultimately distributed to consumers.

While the above-described methods may be useful for their particular purpose, i.e., preventing or controlling diseases and/or decay caused by certain organisms, there still remains room for substantial improvement in methods of extending the shelf life and enhancing the keeping quality of fruits.

SUMMARY OF THE INVENTION

Accordingly, one object of the present invention is to provide a method of extending the shelf life of fruits and of enhancing the keeping quality during handling, packing, shipping, storage and while in the market prior to sale to the consumer, which uses chemicals that are commercially available and are inexpensive.

Another object of the present invention is to provide a method of extending the shelf life and enhancing the keeping quality of fruits which can be easily used, not only by commercial growers, packers or shippers from which the fruit enters many shipping channels and undergoes many handling procedures before ultimately reaching the consumers, but which can also be used by produce farmers who grow the fruits and sell directly to consumers.

Another object of the present invention is to provide a method of extending the shelf life and of enhancing the keeping quality of fruits which does not necessarily entail the addition of extra handling procedures but may be combined with procedures already employed, such as washing, water cooling, waxing, etc.

A further object of the present invention is to provide a method of extending the shelf life and of enhancing the keeping quality of fruits which makes it possible to pick fruit at a stage closer to ripeness than is now possible and thus improve the quality of the fruit at the point where it is sold to the consumer.

These and other objects have been attained by providing a method of extending the shelf life and enhancing the keeping quality of fruits which comprises contacting said fruits with amines selected from the group consisting of naturally occurring monoamines, diamines, polyamines, and related amino acids and their non-toxic salts; esters of naturally occurring related amino acids; naturally occurring precursors of monoamines, diamines, polyamines and their non-toxic salts; naturally occurring metabolites of monoamines, diamines, polyamines and their non-toxic salts; and synthetic analogues of the naturally occurring monoamines, diamines, polyamines and their non-toxic salts. "Related amino acid" as used herein means precursors or metabolites of the useful polyamines.

The method is especially applicable to tomatoes.

DETAILED DESCRIPTION OF THE INVENTION

According to the present invention, the shelf life of fruits is extended and the keeping quality, including storage stability, of fruits is enhanced by contacting the fruits with specific naturally occurring amines, including their non-toxic salts or esters, and synthetic amines of naturally occurring analogues including their non-toxic salts.

The method of contacting the fruits with the amines can be any of numerous known methods, including vacuum infiltration with the amines, dipping in a treating bath containing the amines, spraying or flooding the fruits with the amines, and applying oils or waxes containing the amines.

An especially preferred method is vacuum infiltration.

The fruits which are contacted with the amines can be whole fruits, that is, fruits which still have their skin and have not been further processed, such as by slicing, etc.

The method is also considered to be applicable to processed fruits, that is, fruits which have been peeled or cut, for example, for sale to the consumer in a prepared ready-to-eat form.

Although the methods used for contacting the fruits with the amines are well known to those skilled in the art, for purposes of illustration, examples of some of the methods are described below.

Vacuum Infiltration—Prewashed fruits are submerged in an aqueous solution of the amine, or their non-toxic salts or esters, enclosed within a container to which a vacuum may be applied. A vacuum is applied for a sufficient time to withdraw air from the fruits, but not so long as to damage the fruits. The vacuum is then quickly released, so as to allow uptake by the fruits of the treatment solution.

An alternative method is to place the fruits, submerged in an amine solution, under a pressure of about 1 atmosphere for a brief period of time (1–2 min) to force the solution into the fruits, and then release the pressure.

Details of the use of vacuum infiltration are well known to those skilled in the art.

Dipping in a Treating Bath—Fruits are placed in an aqueous solution of the amine for a time sufficient to allow uptake of the treatment solution. Such treatment may be combined with standard washing treatments which may include sterilants or fungicides etc., but for sanitation reasons a second bath for prewashed and sterilized fruits is preferred. To facilitate entry of the amine into the fruits, the temperature of the bath should be below that of the fruits. This is incompatible with inclusion of the amine in the initial wash which is usually kept at a temperature above that of the fruits. Details, such as application time, and amine concentration can be readily determined by those skilled in the art. The fruits may be washed after treatment to remove the compound from the exterior of the fruits, but this is not required. Specific drying procedures are not essential as long as the fruits are not wet when packed for final shipment.

Spraying—Fruits are sprayed with an aqueous solution of the amine, prior to harvest or after harvest. Timing of application, concentrations used, etc. can be readily determined by those skilled in the art.

Applying Oils or Waxes—Non-toxic oils or waxes containing the amine are applied to the fruits by dipping, spraying, or flooding the fruits provided that the amine used is soluble in the oil or wax. Details of such treatment are well-known to those skilled in the art, and timing, concentrations of amine, etc., can be readily determined by the skilled artisan.

Further, according to the present invention, the time in the ripening cycle at which the fruits are contacted with the amine is not especially critical and can be before or after the fruits have ripened.

More specifically, the fruits are preferably harvested first and then contacted with the amine. The fruits can be harvested at any time from the stage of development at which the harvested fruits are capable of ripening to the ripe stage. The harvested fruit can be contacted with the amine at any time from immediately after harvest (whether ripened or not) up until after ripening (whether ripened on the plant or after harvesting).

According to the present invention the amines which can be used, include any naturally occurring monoamines, diamines, polyamines, related amino acids and their non-toxic salts, as well as esters of related amino acids and naturally occurring precursors and metabolites of the monoamines, diamines, polyamines and their non-toxic salts. Synthetic analogues of the naturally occurring mono-, di- and polyamines and their non-toxic salts can also be used.

Preferred amines are naturally occurring diamines and polyamines, their natural precursors and metabolites and their synthetic analogues.

Especially preferred amines are naturally occurring diamines and polyamines such as spermine, spermidine, and putrescine, and their natural precursors and metabolites.

Specific examples of suitable amines which can be used in the present invention include spermine, i.e., N,N'-bis(3-aminopropyl)-1,4-butanediamine, N,N'-bis(3-aminopropyl) tetramethyline diamine, gerotine, musculamine, neuridine, $H_2NCH_2CH_2CH_2NHCH_2CH_2CH_2CH_2NHCH_2CH_2CH_2NH_2$; spermidine, i.e., N-(3-aminopropyl;-1,4-butanediamine, N-(8-aminopropyl) tetramethylenediamine, $H_2NCH_2CH_2CH_2NHCH_2CH_2CH_2CH_2NH_2$; natural precursors of spermine and spermidine, e.g., S-adenosylmethionine, D- and L- methionine; putrescine, i.e., 1,4-butanediamine, tetramethylene diamine, and $H_2NCH_2CH_2CH_2CH_2NH_2$; natural precursors of putrescine, e.g., agmatine, ornithine, arginine, citrulline; natural metabolites of putrescine, spermidine, and spermine, e.g., diaminopropane, $\beta$-alanine and gamma-aminobutyric acid; tyramine; and cadaverine.

As mentioned above, the amines of the present invention can also be used in the form of their non-toxic salts and the related amino acids can additionally be used in the form of their non-toxic esters as well. Examples of suitable non-toxic salts include hydrochlorides, phosphates, sulfates, iodides, chlorides and p-toluene sulfonates. Examples of suitable non-toxic esters include methyl or ethyl esters of methionine.

Examples of suitable non-toxic amine salts include agmatine sulfate; spermine diphosphate; dispermidine triphosphate; hydrochlorides of cadaverine, putrescine, spermidine, spermine, diaminopropane, tyramine, ornithine, arginine, S-adenosyl-methionine chloride, S-adenosyl metnionine p-toluene sulfonate, and S-adonsylmethionine iodine.

Further, more than one amine (including non-toxic salts and esters) can be used in admixture according to the present invention.

When applied to harvested fruit according to conventional methods such as those described above, the amines are in the form of an aqueous solution or dissolved in an organic solvent. Of course, if the amine is dissolved in an organic solvent, it would only be used for topical use, such as for the waxing method, due to possible toxicity and flavor problems. However, if applied to fruit still on the plant by spraying the plants, the amines can be in the form of a wettable powder.

Wettable powder formulations can readily be prepared by known methods.

The concentration at which the amine is used or the amount of the amine applied depends upon the manner of contacting the fruits with the amine and can readily be determined by those skilled in the art.

For example, suitable concentrations of amines used for vacuum infiltration range from about $10^{-6}M$ to about $10^{-1}M$, preferably from about $10^{-4}M$ to about $10^{-2}M$, depending upon the uptake volume, which may range from 50 microliters to 2 milliliters per fruit, based upon fruit size, time of vacuum application, and desired effect. For dipping in a treating bath, a suitable concentration for the amines is from about $10^{-5}M$ to about 1M. For spraying, a suitable concentration of the amines is from about $10^{-5}M$ to about 1 M. For applying oils or waxes, a suitable concentration for the amines is from about $10^{-6}M$ to about $10^{-1}M$.

The amines (as well as their non-toxic salts and esters) of the present invention can be synthesized by known methods; obtained commercially: or isolated from natural sources by known methods.

According to the present invention, the amines can also be used with additives conventionally used for treatment of stored and/or shipped fruits such as, for example, coating oils, humectants, sterilants, insecticides, fungicides, etc.

The amounts in which these additives are used and the methods of applying them are readily known to those skilled in the art.

While it will be recognized that the degree of enhancement or improvement in shelf life and keeping quality, including storage stability, will vary with the particular type of fruit, the size of the fruit, the degree of ripeness, the treatment method (e.g. vacuum infiltration, dipping in a treating bath, etc.), and the particular shipping, handling, storage and shelf conditions, etc., the applicability of the present invention can readily be determined by testing the increase in shelf life and/or keeping quality relative to an untreated control.

The present invention is particularly applicable to tomatoes, the shelf life of which can be increased up to five-fold by using the method according to the present invention, depending upon the cultivar, the maturity of the fruit, the packing conditions, the shipping conditions, the shelf conditions during retailing, etc.

Optimal ripening, packing, shipping, storage and shelf conditions for tomatoes as well as other fruits are well known to those skilled in the art.

EXAMPLE

The present invention will now be described by reference to a specific example which is not meant to be limiting. Unless otherwise specified, all percents, ratios, etc. are by weight.

SHELF LIFE AND KEEPING QUALITY OF TOMATOES

Tomatoes were harvested at the mature green stage, vacuum infiltrated with test solutions of the indicated compounds, and then placed in darkness at 20° C. and 70% R.H.

The test solutions were aqueous solutions of putrescine (dihydrochloride and free base, $10^{-6}$, $10^{-5}$, $10^{-4}$, $10^{-3}$, $10^{-2}$, and $10^{-1}$M), spermidine (trihydrochloride. triphosphate, and free base, $10^{-6}$, $10^{-5}$, $10^{-4}$, $10^{-3}$, $10^{-2}$, and $10^{-1}$M), spermine (tetrahydrochloride, diphosphate, and free base, $10^{-6}$, $10^{-5}$, $10^{-4}$, $10^{-3}$, $10^{-2}$, $10^{-1}$M), S-adenosyl methionine p-toluene sulfonate ($10^{-2}$M), agmatine sulfate ($10^{-2}$M), citrulline ($10^{-2}$M), diaminopropane dihydrochloride ($10^{-2}$M) methionine ($10^{-2}$ and 5 x $10^{-2}$M), arginine ($10^{-2}$M) ornithine ($10^{-2}$M) tyramine hydrochloride ($10^{-2}$M), and cadaverine dihydrochloride ($10^{-2}$M).

The uptake volume per fruit ranged from 50 microliters to about 2 milliliters.

The number of days past the ripe stage the fruits kept before they were judged to be of unacceptable marketable quality are listed in the table below.

Ripening was determined visually by reference to a color chart (The U.S. Department of Agriculture Color Classification Standards in Tomatoes, USDA Visual Aid TM-L-1).

Specifically, the stored tomato fruits were visually evaluated and rejected at the first appearance of spoilage or, more often, when oversoftening or desiccation occurred (as reflected by permanent deformation in response to slight pressure). The criteria used were similar to those which would be applied by a retail consumer.

| VARIETY TREATMENT | MEAN DAYS STORAGE AFTER RIPENING[1] | RELATIVE STORAGE |
|---|---|---|
| RUTGERS | | |
| Control (20)[2] | 4.1 | 100 |
| Putrescine (12) | 10.5 | 256 |
| Spermidine (7) | 10.9 | 266 |
| Spermine (14) | 9.4 | 229 |
| Agmatine (4)[3] | 11.0 | 268 |
| Tyramine (2) | 10.0 | 244 |
| Citrulline (3) | 7.3 | 178 |
| Arginine (2) | 13.0 | 317 |
| Ornithine (2) | 13.5 | 329 |
| Diaminopropane (6) | 12.3 | 300 |
| S-Adenosyl Methionine (2) | 20.5 | 500 |
| Cadaverine (2) | 10.0 | 244 |
| ALC RED | | |
| Control (14) | 6.9 | 100 |
| Putrescine (10) | 11.4 | 165 |
| Spermidine (10) | 15.5 | 225 |
| Spermine (10) | 15.1 | 219 |
| Agmatine (2) | 9.0 | 130 |
| Tyramine (2) | 10.0 | 145 |
| Citrulline (2) | 14.0 | 203 |
| Arginine (2) | 12.5 | 181 |
| Diaminopropane (7) | 11.9 | 172 |
| Methionine (7) | 15.0 | 217 |

[1]Length of storage after ripening before decay, oversoftening, or desiccation of fruits occurred.
[2]Number in parentheses indicates number of fruits in sample.
[3]For three other agmatine fruits, the time period between the mature green stage and ripening was greatly increased by a prolongation of the light red stage. Other treatments had little effect on the time interval between mature green and ripe stages.

The above results indicate that all of these compounds are capable of significantly extending the shelf life and keeping quality of tomatoes.

While the invention has been described in detail and with reference to specific embodiments thereof, it will be apparent lo one skilled in the art that various changes and modifications can be made therein without departing from the spirit and scope thereof.

What is claimed is:

1. A method of extending the shelf life and of enhancing the keeping quality of whole ripened tomatoes which comprises the step of:
    contacting said whole ripened tomatoes with amines selected from the group consisting of
    naturally occurring monoamines;
    naturally occurring polyamines;
    naturally occurring precursors of monoamines;
    naturally occurring precursors of polyamines;
    naturally occurring non-toxic of said naturally occurring precursors of monoamines and said naturally occurring precursors of polyamines;
    naturally occurring metabolites of monoamines;
    naturally occurring metabolites of polyamines;
    naturally occurring non-toxic salts of said naturally occurring metabolites of monoamines and said naturally occurring metabolites of polyamines;
    analogues of naturally occurring monoamines;
    analogues of naturally occurring polyamines; and
    analogues of said naturally occurring non-toxic salts of said naturally occurring metabolites of monoamines and said naturally occurring metabolites of polyamines.

2. The method of claim 1, wherein said amines are naturally occurring monoamines or naturally occurring polyamines.

3. The method of claim 2, wherein said amines are naturally occurring polyamines.

4. The method of claim 3, wherein said amines are selected from the group consisting of spermine, spermidine, and putrescine.

5. The method of claim 1, wherein said contacting step comprises vacuum infiltration of said whole ripened tomatoes with said amines.

6. The method of claim 1, wherein said contacting step comprises dipping said whole ripened tomatoes in a treating bath contacting said amines.

7. The method of claim 1, wherein said contacting step comprises spraying said whole ripened tomatoes with said amines.

8. The method of claim 1, wherein said contacting step comprises applying oils or waxes containing said amines to said whole ripened tomatoes.

9. The method of claim 3, wherein said polyamines are diamines.

10. A method of extending the shelf life and of enhancing the keeping quality of whole ripened tomatoes which comprises:
   contacting said whole ripened tomatoes with at least one amine selected from the group consisting of agmatine, arginine, β-alanine, cadaverine, citrulline, diaminobutane, diaminopropane, methionine, gamma aminobutyric acid, gerotine, musculamine, neuridine, ornithiue, putrescine, S-adenosyl methionine, spermidine, spermine, tetramethylenediame,
   a non-toxic salt of said at least one amine;
   an ester of said at least one amine; or
   a metabolite of said at least one amine.

11. The method of extending the shelf life and of enhancing the keeping quality of whole ripened tomatoes as claimed in claim 10 which comprises:
   contacting said whole ripened tomatoes with a non-toxic salt of one or more of said at least one amine selected from the group of claim 10.

12. The method of extending the shelf life and of enhancing the keeping quality of whole ripened tomatoes as claimed in claim 11 wherein said non-toxic salt is selected from the group consisting of a hydrochloride, phosphate, sulfate, iodide, chloride, and p-toluene sulfonate salt of said at least one amine selected from the group of claim 10.

* * * * *